United States Patent [19]

Fink

[11] Patent Number: 5,520,477
[45] Date of Patent: May 28, 1996

[54] CONNECTING SYSTEM

[75] Inventor: Kevin G. Fink, Toledo, Ohio

[73] Assignee: SeaGate, Plastics, Waterville, Ohio

[21] Appl. No.: 255,056

[22] Filed: Jun. 7, 1994

[51] Int. Cl.⁶ ..................................................... F16B 5/06
[52] U.S. Cl. ........................... 403/397; 403/231; 403/329; 403/403; 403/402; 220/642; 206/509
[58] Field of Search .................................... 403/243, 240, 403/241, 245, 187, 289, 290, 397, 405.1, 406.1, 326, 329, 324, 321, 319, 403, DIG. 10, 205, 401, 402, 300, 309, 380, 382; 220/642; 206/509, 821; 229/915, 198.1, 199; 24/536; 52/586.1, 586.2; 256/24, 65

[56] References Cited

U.S. PATENT DOCUMENTS

| | | | |
|---|---|---|---|
| 2,791,336 | 5/1957 | Stairwalt | 211/149 |
| 3,220,633 | 11/1965 | Swane | 229/49 |
| 3,226,008 | 12/1965 | Chiorri | 229/49 |
| 3,485,006 | 12/1969 | De Rozario | 403/245 X |
| 3,672,708 | 6/1972 | Zemberry | 403/326 X |
| 3,989,397 | 11/1976 | Baker | 403/231 X |
| 4,210,274 | 7/1980 | Leonard | 229/49 |
| 4,385,850 | 5/1983 | Bobaty | 403/403 X |
| 4,493,425 | 1/1985 | Yoshida | 211/189 |
| 4,619,365 | 10/1986 | Kelly et al. | 206/503 |
| 4,712,942 | 12/1987 | Brown | 403/403 X |
| 4,720,013 | 1/1988 | Nichols et al. | 206/506 |
| 4,746,053 | 5/1988 | Nichols | 229/120.36 |
| 4,971,201 | 11/1990 | Sathre | 220/642 X |
| 5,033,669 | 7/1991 | Federico | 220/642 X |
| 5,037,027 | 8/1991 | Nichols | 229/198 |
| 5,161,909 | 11/1992 | Crouse et al. | 403/397 X |
| 5,295,632 | 3/1994 | Zink et al. | 229/198 |

FOREIGN PATENT DOCUMENTS

| | | | |
|---|---|---|---|
| 2277731 | 11/1994 | United Kingdom | 229/199 |

*Primary Examiner*—Kenneth J. Dorner
*Assistant Examiner*—Harry C. Kim
*Attorney, Agent, or Firm*—Emch, Schaffer, Schaub & Porcello Co.

[57] ABSTRACT

The invention is directed to a connecting system for use with sheet material. At least one opening is disposed in the sheet material and the opening defines an edge. A clip is positioned for engaging the opening. The clip is substantially U-shaped and has a base and two legs that extend from the base. The legs are disposed in substantially parallel spaced apart relationship. an interior projection is positioned on each leg and the interior projections extend towards the opposed leg. The interior projections are disposed to engage the edge of the opening in the sheet material to removably secure the clip to the sheet material. An exterior projection is positioned on each leg and extend in a direction away from the opposed leg. A connector is provided for engaging the clip. The connector has a generally U-shaped portion having a base and two legs that extend from the base. The legs are disposed in substantially parallel spaced apart relationship. A notch is positioned on each leg. The connector is positioned over the clip so that the exterior projections engage the notches in the connector and removably secure the connector to the clip and the sheet material.

21 Claims, 3 Drawing Sheets

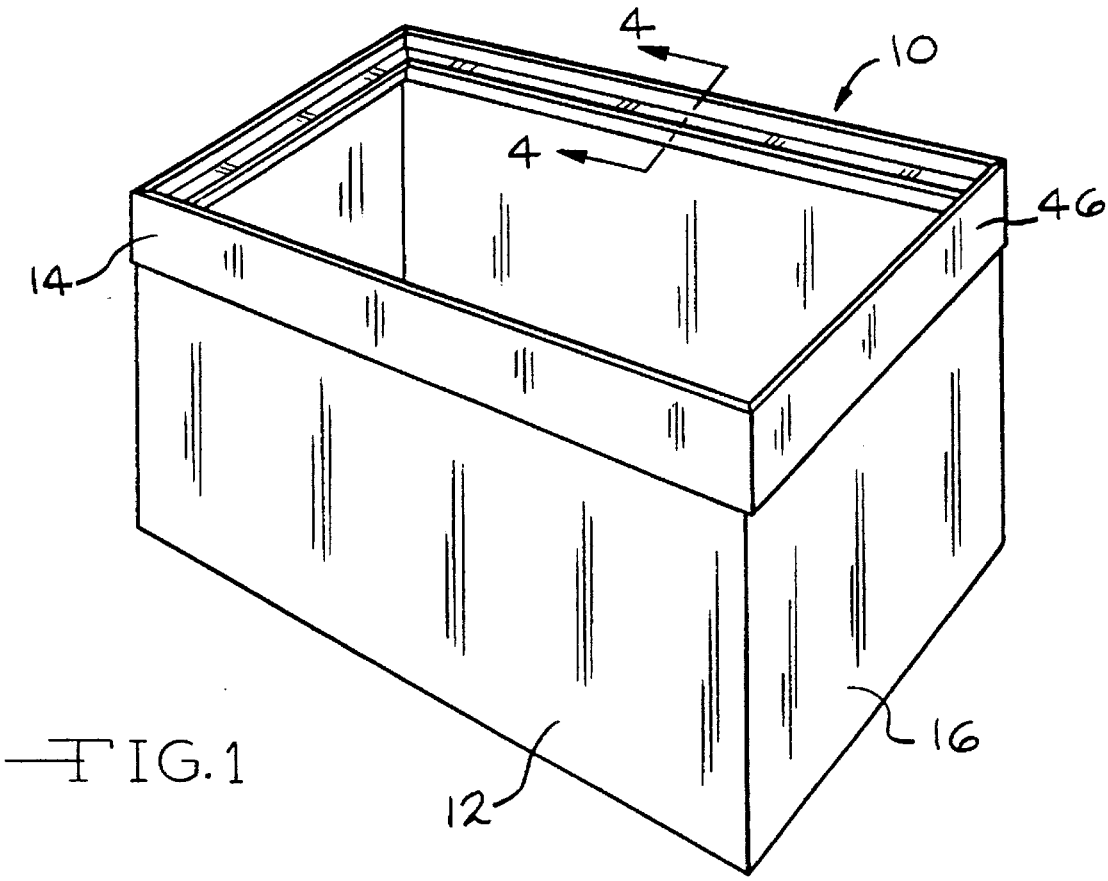
FIG. 1
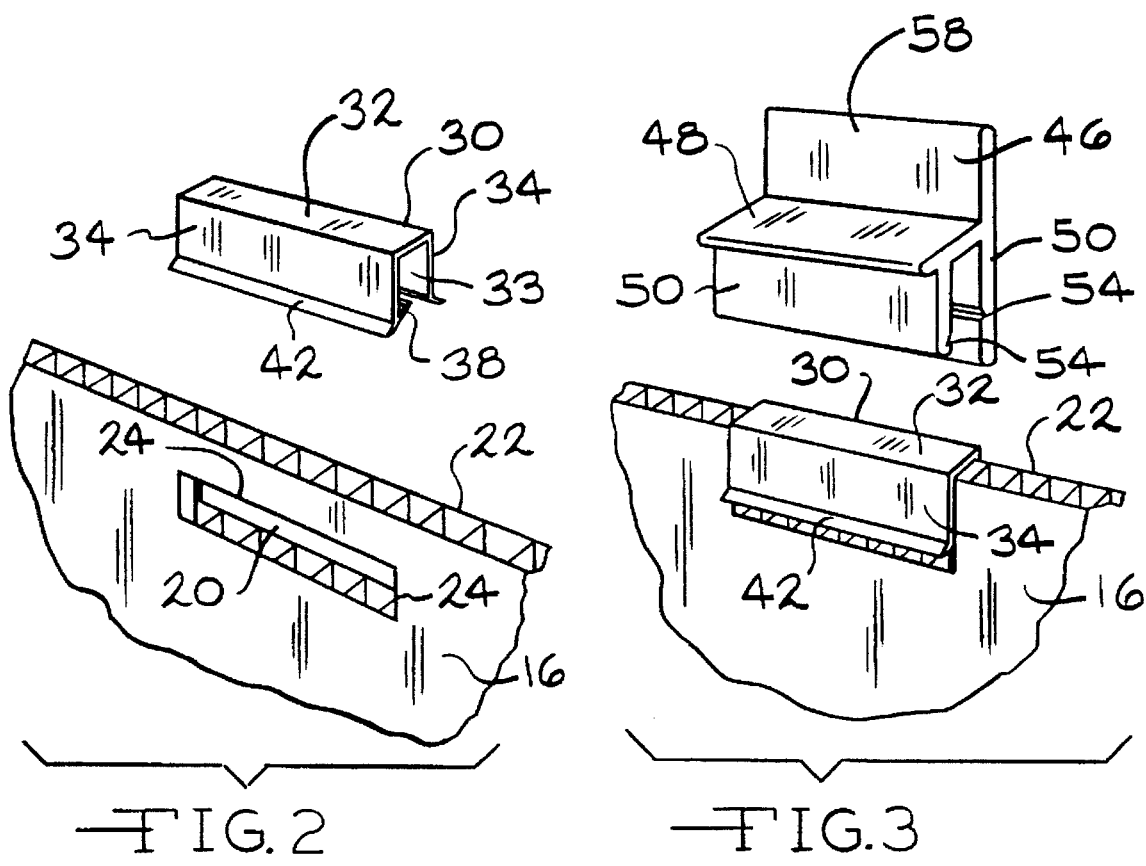
FIG. 2
FIG. 3

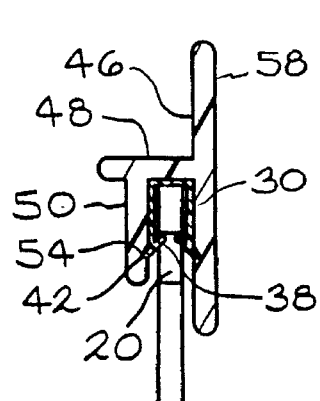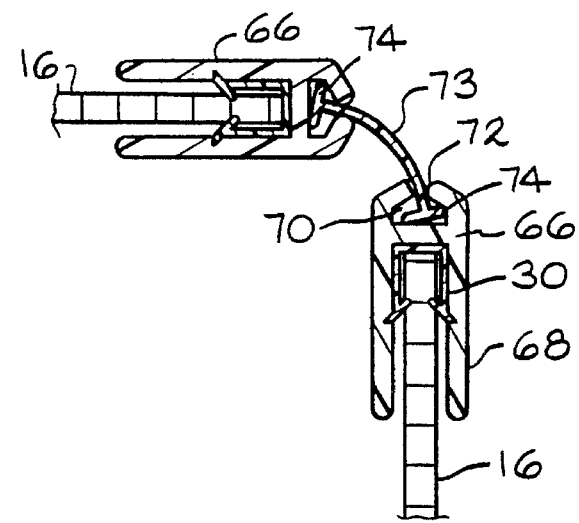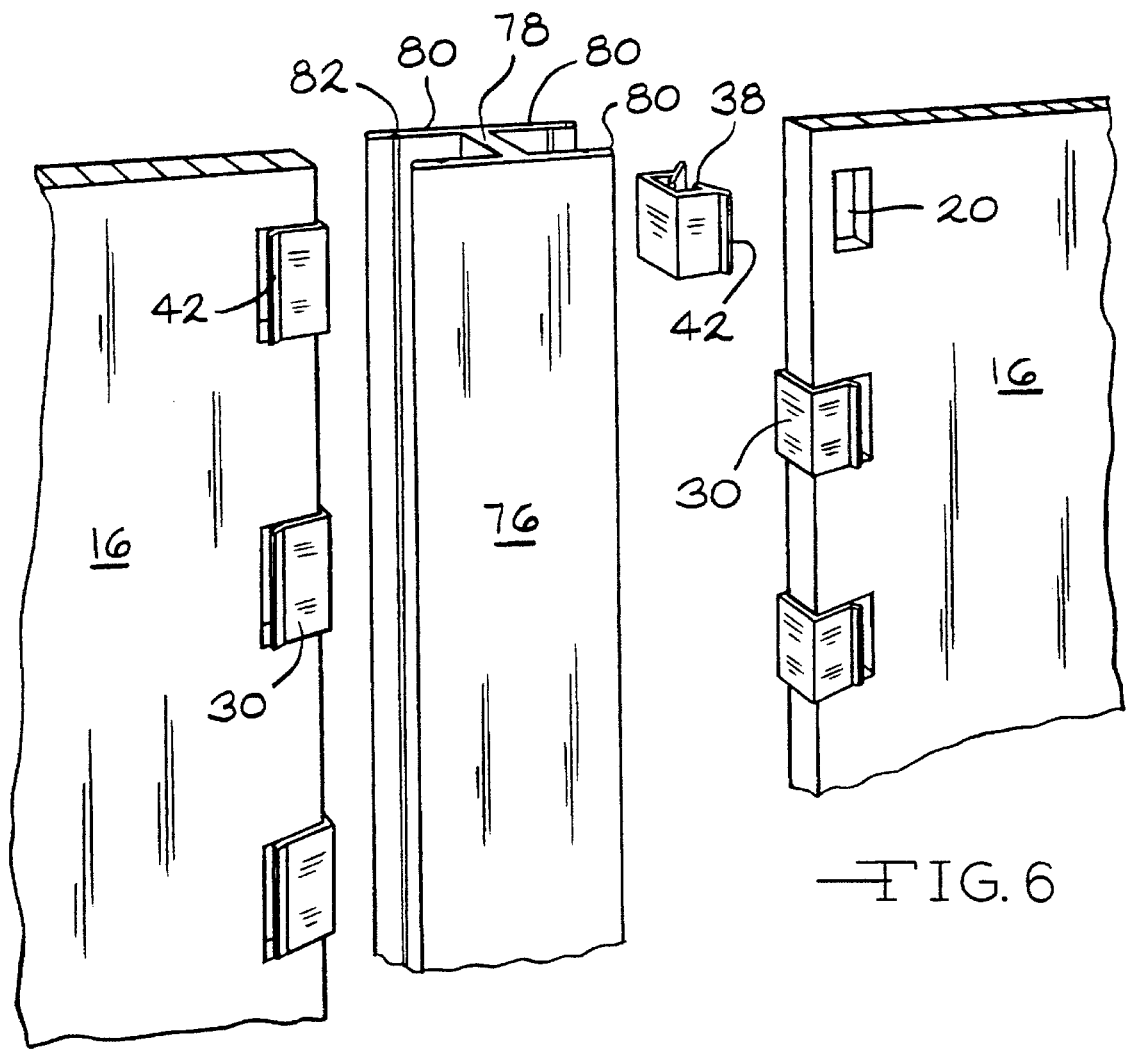

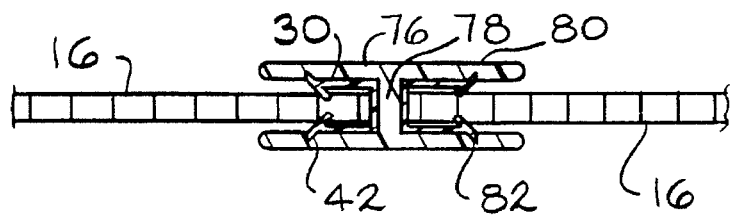
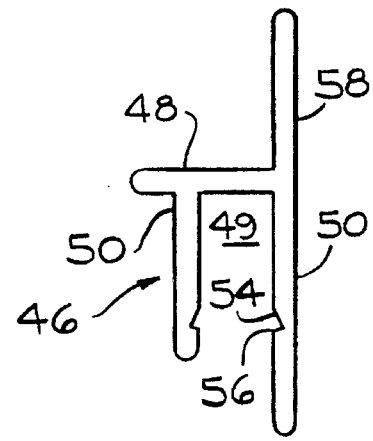
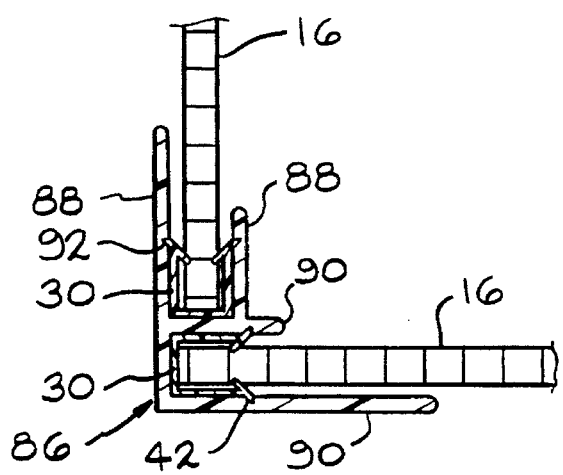
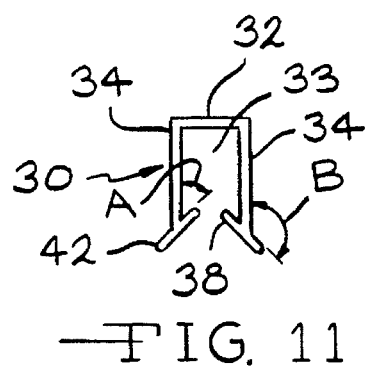
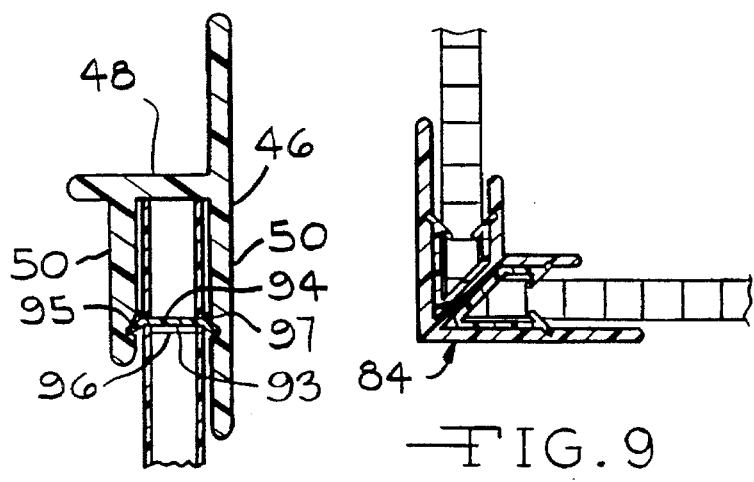

CONNECTING SYSTEM

BACKGROUND ART

This invention relates to a connecting system that can be used with sheet material. More particularly, it is a connecting system that is removably secured to the sheet material so that the connecting system can be conveniently positioned or removed from the sheet material as desired.

One of the primary uses of the connecting system of the present invention is for tote boxes. Tote boxes are containers which are used to transport, store and display various goods. These boxes are frequently designed so that they can be stacked or mounted in a nesting relationship for convenient transportation or storage. In order to be stackable the upper ridge of the tote box is typically reinforced with a top rail or rim member which is adapted to receive another tote box stacked thereon. It is conventional to use a variety of materials for the construction of such tote boxes. The materials can include corrugated paperboard, corrugated plastic sheet, sheet material and other such materials. Typically the tote boxes are constructed using fasteners such as rivets, staples, screws or glue to secure the top rail to the tote box. These fasteners add considerable expense to the finished tote box as the fasteners are expensive and time consuming to install. Such fasteners also securely affix the corrugated or sheet material to the top rail and it is almost impossible to separate the corrugated or sheet material from the top rail.

These previous fastening systems make it very difficult to replace a top rail or reuse the top rail if the tote container is damaged. The prior art fastening systems effectively join together the corrugated or sheet material to the top rail so that the top rail cannot be separated from the sheet material when it is desired to recycle the tote box container. The securing methods found in the prior art also make it necessary to construct the tote box before it is shipped to the end user.

Accordingly, there is a need in the industry for a connecting system that can be used to removably secure components to corrugated or sheet material.

DISCLOSURE OF THE INVENTION

The invention is directed to a connecting system for use with sheet material. At least one opening is disposed in the sheet material and the opening defines an edge. A clip is positioned for engaging the opening. The clip is substantially U-shaped and has a base and two legs that extend from the base. The legs are disposed in substantially parallel spaced apart relationship. An interior projection is positioned on each leg and the interior projections extend towards the opposed leg. The interior projections are disposed to engage the edge of the opening in the sheet material to removably secure the clip to the sheet material. An exterior projection is positioned on each leg and extend in a direction away from the opposed leg. A connector is provided for engaging the clip. The connector has a generally U-shaped portion having a base and two legs that extend from the base. The legs are disposed in substantially parallel spaced apart relationship. A notch is positioned on each leg. The connector is positioned over the clip so that the exterior projections engage the notches in the connector and removably secure the connector to the clip and the sheet material.

DESCRIPTION OF THE DRAWINGS

FIG. 1 is a perspective view showing a tote box utilizing the connecting system of the present invention.

FIG. 2 is a partial exploded perspective view showing a portion of the connecting system of the present invention.

FIG. 3 is a partial exploded perspective view showing the connecting system of the present invention.

FIG. 4 is a cross-sectional view taken along line 4—4 in FIG. 1.

FIG. 5 is a cross-sectional view of another embodiment of the connecting system of the present invention.

FIG. 6 is an exploded perspective view of another embodiment of the connecting system of the present invention.

FIG. 7 is a partial cross-sectional view of the connecting system of the FIG. 6.

FIG. 8 is a cross-sectional view of another embodiment of a connecting system of the present invention.

FIG. 9 is a cross-sectional view of another embodiment of the connecting system.

FIG. 10 is an end view of the clip shown in FIG. 2.

FIG. 11 is an end view of the connector shown in FIG. 3.

FIG. 12 is a side view of another embodiment of the connecting system of the present invention.

BEST MODE OF CARRYING OUR INVENTION

This patent application is directed to a connecting system for use with sheet material. More particularly the invention is directed to a clip and connector that can be used to removably secure items to corrugated or other type of sheet material.

The connecting system 10 shown in FIG. 1 is utilized in connection with a tote box 12. As used in FIG. 1, the connecting system locks a top rail 14 to the tote box 12. The tote box 12 is usually formed of a corrugated material 16 that is formed from plastic such as polyethylene or polypropylene. However, it should be understood that corrugated material made from other materials can be utilized and that the connecting system will work with other non-corrugated sheet material. Further, the connecting system can be utilized with products other than to be boxes. However, to facilitate the explanation of the invention, a tote box example will be used.

FIGS. 1–4, 10 and 11 show the features of the connecting system 10 in more detail. The corrugated material 16 has a plurality of openings 20 that are disposed adjacent an outer edge 22 of the corrugated material 16. The openings 20 are substantially rectangular in shape and define an edge 24 that extends around the periphery of the openings 20. The openings 20 are disposed so that one side or edge 24 of the opening is substantially parallel to the outer edge of the corrugated material 16. The openings 20 are usually disposed so that the longitudinal axis of the opening is substantially parallel to the outer edge 22 of the corrugated material. The openings 20 are positioned so that the openings are all spaced substantially the same distance from the outer edge 22 of the corrugated material 16. The number of openings that are positioned in the corrugated material 16 depends on the size and strength of the corrugated material and also the end use for which the connecting system 10 is to be utilized. However, in practice it has been found that from about 1 to about 3 openings per linear foot of corrugated material is suitable for most applications. Further, it has been found that the openings 20 should have a length from about 1 to about 4 inches and a height from about ¼ to about ⅜ inches. As previously discussed the longitudinal axis of the opening 20 is positioned to be substantially parallel to the outer edge 22 of the corrugated material 16. The edge 24 of the opening 20 that is adjacent the outer edge 22 of the corrugated material 16 is spaced from about ⅜ to about ¾ inches from the outer edge 22.

The connecting system 10 includes a clip 30 for engaging the openings 20 in the corrugated material 16. The clip 20 is substantially U-shaped and has a base 32 and two legs 34 that extend from the base 32. The legs 34 extend from the base 32 in the same direction and the legs are disposed in substantially parallel relationship. The base 32 and legs 34 define a U-shaped channel 33. The clip 30 is made of a resilient material such as plastic or metal.

An interior projection 38 is positioned on each leg and the interior projections extend toward the opposed leg and extend into the channel 33. The interior projections 38 are disposed to engage the edge 24 of the opening 20 in the corrugated material 16 to removably secure the clip to the sheet material. To insure the proper relationship for the interior projections 38, the base 32 of the clip 30 is only slightly wider than the thickness of the corrugated material 16. This spaces the legs 34 of the clip 30 immediately adjacent the surfaces of the corrugated material 16. As the clip 30 is positioned on the corrugated material 16, the legs 34 of the clip 30 are deformed outwardly or away from each other to allow the interior projections 38 to pass along the surface of the corrugated material. When the interior projections 38 come into alignment with the opening 20, the interior projections extend into the opening and the legs 34 of the clip 30 return or spring back to their original position so that the interior projections 38 engage the edge 24 of the opening 20. As the legs 34 are made of a resilient material and have snapped back to their original position when the interior projections 38 are in alignment with the opening 20, the interior projections will be maintained in engagement with the edge 24 of the opening until the legs 34 are displaced to move the interior projections out of engagement with the edge 24. This insures that the clip 30 is secured to the corrugated material 16 and can only be removed by deflecting the legs 34 of the clip.

The interior projections 38 extend from the legs 34 a distance that is from about 20% to about 50% of the distance between the opposed legs 34. The interior projections 38 can also be disposed at an angle A that is from about 30° to about 60° with respect to the legs 34 of the clip 30. Usually the interior projections 38 are positioned so that they extend in a direction toward the base 32 as this assists in securing the clip 30 to the corrugated material 16.

An exterior projection 42 is positioned on each leg 34 of the clip 30. The exterior projections 42 extend in a direction away from the opposed leg 34. The exterior projections are usually disposed at an angle B that is from about 120° to about 150° with respect to the legs 34. In practice it has been found desirable to have the exterior projection 42 disposed at an angle so that it projects away from the base 32 of the clip 30. The exterior projection 42 and the interior projection 38 can be formed as a single piece of material that extends at the end of each leg 34 of the clip 30.

A connector 46 is constructed for engaging the clip 30. The connector 46 has a generally U-shaped portion having a base 48 and two legs 50 that extend from the base. The legs 50 are disposed in substantially parallel spaced apart relationship and they are disposed substantially perpendicular to the base 48. The legs 50 extend from the base 48 in the same direction. The base 48 and legs 50 define a U-shaped channel 49. The connector 46 is formed from a resilient material such as plastic or metal. A notch 54 is positioned in each leg so that the notches are in opposed relationship. The legs 50 of the connector 46 are spaced apart a distance that is just slightly larger than the width of the base 32 of the clip 30. The legs 50 are positioned to extend along the legs 34 of the clip 30 so that the exterior projections 42 of the clip 30 will engage the notches 54 on the legs 50 of the connector 46 to secure the connector to the clip 30. The exterior projections 42 extend from the legs 34 so that the clip 30 in the area of the exterior projections 42 is wider than the space between the legs 50 of the connector 46. Accordingly, when the legs 50 of the connector 46 engage the exterior projections 42, the legs 50 will be caused to deflect outwardly and the legs 34 of the clip 30 will be caused to deflect inwardly until the exterior projections 42 come into alignment with the notch 54. When the exterior projections 42 are in alignment with the notches 54, the legs 50 of the connector 46 and the legs 34 of the clip 30 will return or snap back to their original position and secure the exterior projections 42 in the notches 54. The notches 54 define a shoulder 56 that engages the exterior projection 42 and removably locks the connector 46 to the clip 30.

The connector 46 has a rail portion 58 that extends from the base 48 in a direction opposite to the legs 50. The rail portion 58 is disposed substantially perpendicular to the base 48. The rail portion 58 provides a vertical lip which facilitates stacking of multiple tote boxes 12.

The clip 30 and the connector 46 are formed of resilient materials that can be at least slightly deformed but that return to their original position when the forces that cause the deformation are removed. These components are usually extruded and can be formed from plastic material such as polyvinyl Chloride and other thermoplastics from metal such as aluminum or steel.

In operation, the tote box 12 as shown in FIG. 1 is constructed having an opening on one end. A plurality of openings are positioned in the corrugated material 16 adjacent to the open end of the tote box 12. Clips 30 are advanced over the corrugated material 16 and the interior projections 38 on the legs 34 cause the legs 34 to deflect outwardly as the clips 30 are advanced onto the corrugated material. When the interior projections 38 are in alignment with the openings 20, the legs 34 spring back to their original position and the interior projections 38 engage the edge 24 of the opening 20 and secure the clips to the corrugated material. The clips 30 are positioned in spaced apart relationship around the outer periphery of the opening in the tote box 12. A sufficient number of clips 30 are utilized to provide the strength requirements for the connecting system 10.

The connector 46 is advanced over the clips 30 and the legs 50 of the connector and the legs 34 of the clip will be displaced when the legs 50 engage the exterior projection 42 on the clips 30. When the notches 54 on the connector 46 are in alignment with the exterior projections 42 on the clips 30, the legs 34 and legs 50 will return to their original position and the exterior projections 42 will engage the shoulder 56 of the notch 54 to effectively secure the connector to the clips. The connector 46 usually forms a continuous member around the opening of the tote box 12 as shown in FIG. 1.

It should be noted that the clip 30 is removably secured to the corrugated material 16 and that the connector 46 is removably secured to the clip 30. If it is desired to remove the connector 46, it is only necessary to displace the legs 50 of the connector so that the shoulder 56 of the notch 54 no longer engages the exterior projections 42 of the clip 30 and the connector can be removed from the clip 30. In the same manner, the clip 30 can be removed from the corrugated material 16 by displacing the legs 30 so that the interior projection 38 no longer engages the edge 24 of the opening 20. In this manner, the clip 30 can be effectively removed from the corrugated material. This connecting system allows different connectors 46 to be secured to the corrugated material. If the connector 46 shown in FIG. 1 becomes damaged it is possible to remove the damaged connector 46 and replace it with a new connector. It is also possible to remove the connector 46 and replace it with a new connector that has a different function or purpose. Also, if the tote box 12 is to be disposed of, the connector 46 and the clip 30 can be removed from the tote box 12 so that the materials used to form the tote box can be effectively recycled. Since the clip 30 and connector 46 can be separated from the corrugated material 16, it is possible to effectively recycle the plastic or metal pieces that form the clip and connector and to recycle the corrugated material that forms the tote box. Since the clip 30 and connector 46 are removed from the corrugated material there is no difficulty with having dissimilar or contaminating material reduce the recyclability of the tote box 12. In addition, since the clip 30 and connector 46 are removably secured to the tote box 12, it is much easier to separate these components and this greatly assists in recyclability of the tote box container.

FIG. 5 shows another embodiment of the present invention. In this embodiment connector 66 is utilized to form a corner between two adjacent pieces of corrugated material 16. The clips 30 are positioned to engage the openings 20 on the corrugated material as previously described. The connectors 66 are positioned on the clips 30 in the manner previously described. However, the portion of the connector 66 that is spaced apart from the leg 68 that engage the clip 30 forms a channel 70 having an opening 72. A flexible web 73 extends between the channels 70 on adjacent connectors 66. A foot 74 on the flexible web is positioned in the channel 70 and secures the flexible web 73 to the connectors 66. The foot 74 is constructed so that it is substantially perpendicular to the flexible web 73 and the foot 74 is substantially wider than the opening 72 in the connectors 66. The flexible web 73 allows the connector 66 to form a flexible joint between two adjacent pieces of corrugated material 16.

FIGS. 6 and 7 show another embodiment of the present invention whereby a connector 76 can be utilized to connect together two adjacent pieces of corrugated material 16. The clips 30 and openings 20 in the corrugated material 16 are as previously shown and described. The connector 76 has a base 78 and substantially parallel opposed legs 80 that extend from each side of the base 78. The legs 80 have a notch 82 that is disposed to engage the exterior projection 42 on the clips 30 in the manner previously described. The connector 76 allows adjacent sheets of corrugated material 16 to be joined together to form a panel or sheet of the corrugated material.

FIG. 8 shows another embodiment of the present invention whereby a connector 86 can be utilized to form a corner between two pieces of corrugated material 16. The openings 20 in the corrugated material and the clips 30 function in a manner as previously described. The connector 86 has a first pair of spaced apart substantially parallel legs 88 and a second pair of substantially parallel spaced apart legs 90. The second pair of legs 90 is disposed substantially perpendicular to the first pair of legs 88. The first and second pair of legs contain notches 92 and these notches engage the exterior projections 42 on the clips 30 in the manner previously described to secure the connector 86 to the clips 30. The connector 86 allows the formation of a 90° corner between adjacent pieces of corrugated material 16.

FIG. 9 shows another embodiment of the present invention whereby a connector 84 can be utilized to form a corner between two pieces of sheet material 16. The connector is substantially the same as the connector 86 shown in FIG. 8 except that a mitered type of corner is being formed. The connector 84 is the same in all other respects as the connector 86 and for the sake of brevity the features of this embodiment will not be repeated.

FIG. 12 shows another embodiment of the present invention. This embodiment utilizes a clip 94 to secure a connector 46 to corrugated material 16. The sheet material has a plurality of slots 96 that are located adjacent the outer edge of the sheet material. The slots 96 are positioned substantially in the same manner as the previously described openings 20. The clip 94 has a base 93 and a flange 95 that extends from each end of the base. The base 93 is constructed to be positioned in the slots 96 in the corrugated material 16. The base 93 has a length that is substantially the same as the thickness of the corrugated material 16. The base 93 can have a thickness that provides a tight or slight interference fit with slots 96 to maintain the slip 94 in the desired position in the slots. A ridge 97 can be positioned on each end of said base 93 to engage the edge of the corrugated material to maintain the base in the desired position with respect to the corrugated material.

The flanges 95 on each end of the base 93 are disposed to engage the notch 54 in the legs 50 of the connector 46. The flanges 95 project from the base 93 so that the legs 50 of the connector 46 are displaced when the connector is positioned on the clip 94. When the flanges 95 are in alignment with the notches 54 on the connector 46 the legs 50 will move back to their original position and the connector will be removably secured to the clip 94 and corrugated material 16. The flanges 95 are usually disposed at an angle from about 20° to about 60° with respect to said base 93. It should also be noted that the clip 94 can be utilized with other connectors, including the connectors that are disclosed in other portions of this patent application.

The above description is given for the sake of explanation. Various substitutions and modifications, other than those cited, can be made without departing from the scope of the following claims.

I claim:

1. A connecting system comprising:

at least one opening disposed in a sheet material, said opening defining an edge around said opening;

a clip for engaging said opening, said clip being substantially U-shaped and having a base and two legs that extend from said base, said legs being disposed in substantially parallel spaced apart relationship;

an interior projection is positioned on each leg and said interior projections extend towards said opposed leg; said interior projections being disposed to engage said edge of said opening in said sheet material to removably secure said clip to said sheet material;

an exterior projection is positioned on each leg, said exterior projections extend in a direction away from said opposed leg; and a connector for engaging said clip, said connector having a generally U-shaped portion having a base and two legs that extend from said base, said legs being disposed in substantially parallel spaced apart relationship, a notch being positioned on each leg, said connector being positioned over said clip whereby said exterior projections engage said notches in said connector and removably secure said connector to said clip and sheet material.

2. The connecting system of claim 1, wherein said legs of said clip are made of a resilient material and can be displaced to accommodate said sheet material and said connector.

3. The connecting system of claim 2, wherein said sheet material is thicker than the space between said interior projections, said legs of said clip being displaced when said clip is positioned over said sheet material, said legs of said clip resiliently moving back to their original position when said interior projections are in position in said opening in said sheet material, said resilient spring back of said leg of said clip assisting in engaging said interior projections with said edge of said opening to removably secure said clip to said sheet material.

4. The connecting system of claim 2, wherein the distance from the ends of the exterior projections is greater than the space between said opposed legs of said connector, said legs of said clip being displaced when said connector is positioned over said clip, said legs of said clip resiliently moving back to their original position when said exterior projections engage said notches in said legs of said connector, said resilient spring back of said legs of said clip assisting in engaging said exterior projections with said notches to removably secure said connector to said clip and said sheet material.

5. The connecting system of claim 1, wherein a flange is positioned at the end of each leg of said clip said flange forming said interior and exterior projections.

6. The connecting system of claim 1, wherein said interior projections are disposed at an angle from about 30° to about 60° with respect to said legs of said clip.

7. The connecting system of claim 6, wherein said interior projections are disposed to extend in a direction generally towards said base.

8. The connecting system of claim 1, wherein said exterior projections are disposed at an angle from about 120° to about 150° with respect to said legs of said clip.

9. The connecting system of claim 8, wherein said exterior projections are disposed to extend in a direction generally away from said base.

10. The connecting system of claim 9, wherein said notches in said legs of said connector are disposed at an angle from about 30° to about 60° with respect to said legs of said connector.

11. The connecting system of claim 1, wherein a plurality of openings are positioned in said sheet material and a clip is positioned in each opening.

12. The connecting system of claim 11, wherein said sheet material includes an outer edge, said openings are positioned adjacent said outer edge of said sheet material.

13. The connecting system of claim 1, wherein said connector has a rail that extends from said base in a direction away from said legs.

14. The connecting system of claim 1, wherein said connector has another pair of legs extending from said base on the side opposite the side having said two legs, said another pair of legs being disposed to engage a clip positioned on another sheet material whereby said connector secures together two said sheet material.

15. The connecting system of claim 1, wherein said connector has a second pair of legs that extend perpendicular to said legs that extend from said base, said second pair of legs being disposed to engage clips positioned on sheet material whereby said connector forms a corner between two adjacent pieces of sheet material.

16. A connecting system comprising:
   at least one slot disposed in a sheet material, said slot defining an edge;
   a clip for engaging said slot, said clip having a base and a flange that extends from each end of said base; and
   a connector for engaging said clip, said connector having a generally U-shaped portion having a base and two legs that extend from said base, said legs being disposed in substantially parallel spaced apart relationship, a notch being positioned on each leg, said connector being positioned over said sheet material whereby said flanges engage said notches in said connector wherein the distance from the ends of the flanges is greater than the space between said opposed legs of said connector, said legs of said connector being displaced when said connector is positioned over said clip, said legs of said connector resiliently moving back to their original position when said flanges engage said notches in said legs of said connector, said resilient spring back of said legs of said connector assisting in engaging said flanges with said notches to removably secure said connector to said clip and sheet material.

17. The connecting system of claim 16, wherein said flanges are disposed at an angle from about 30° to about 60° with respect to said base of said clip.

18. The connecting system of claim 16, wherein said notches in said legs of said connector are disposed at an angle from about 30° to about 60° with respect to said legs of said connector.

19. The connecting system of claim 16, wherein a plurality of slots are positioned in said sheet material and a clip is positioned in each slot.

20. The connecting system of claim 19, wherein said sheet material includes an outer edge, said slots are positioned adjacent said outer edge of said sheet material.

21. The connecting system of claim 16, wherein said connector has a rail that extends from said base in a direction away from said legs.

* * * * *